(12) United States Patent
Parmenter et al.

(10) Patent No.: US 7,322,083 B2
(45) Date of Patent: Jan. 29, 2008

(54) MANUFACTURING SYSTEM ARCHITECTURE FOR TOOLS

(75) Inventors: Philip Parmenter, Reading (GB); Guido Drees, Rahden (DE); Norbert Scheid, Wincheringen (DE)

(73) Assignee: Nokia Corporation

( * ) Notice: Subject to any disclaimer, the term of this patent is extended or adjusted under 35 U.S.C. 154(b) by 71 days.

(21) Appl. No.: 11/291,407

(22) Filed: Nov. 30, 2005

(65) Prior Publication Data

US 2007/0119036 A1 May 31, 2007

(51) Int. Cl.
*B23P 23/00* (2006.01)

(52) U.S. Cl. .................. 29/33 P; 29/563; 700/200; 700/162

(58) Field of Classification Search .............. 29/33 P, 29/564, 564.1, 563, 26 A, 423; 414/226.03, 414/226.04, 226.05, 222.02, 222.07, 222.13; 198/346.1, 346.3, 345.3, 340; 700/200, 162, 700/197
See application file for complete search history.

(56) References Cited

U.S. PATENT DOCUMENTS

| | | | | |
|---|---|---|---|---|
| 4,722,653 A | * | 2/1988 | Williams et al. ............... | 29/563 |
| 4,782,567 A | * | 11/1988 | Kanaya et al. ............... | 29/33 P |
| 5,237,736 A | * | 8/1993 | Inoue et al. ................. | 29/563 |
| 5,310,396 A | * | 5/1994 | Momoi et al. ................ | 29/33 P |
| 5,321,874 A | * | 6/1994 | Mills et al. .................. | 29/33 P |
| 5,321,885 A | * | 6/1994 | Hino et al. .................. | 29/33 P |
| 6,074,329 A | * | 6/2000 | Hirano et al. ............... | 29/33 P |
| 6,094,793 A | * | 8/2000 | Szuba ......................... | 29/33 P |
| 6,190,117 B1 | * | 2/2001 | Lichti ......................... | 414/800 |
| 6,745,454 B1 | * | 6/2004 | Grimshaw et al. ............ | 29/563 |
| 6,754,557 B2 | | 6/2004 | Graham | |
| 6,772,493 B2 | * | 8/2004 | Yamanashi et al. ......... | 29/33 P |
| 7,076,865 B2 | * | 7/2006 | Morbitzer et al. ............ | 29/799 |
| 2002/0090411 A1 | | 7/2002 | Dahl et al. ................... | 425/258 |
| 2003/0055525 A1 | | 3/2003 | Graham ...................... | 700/162 |
| 2003/0145449 A1 | * | 8/2003 | Lutz ............................ | 29/564 |
| 2005/0241129 A1 | * | 11/2005 | Naumann et al. ........... | 29/33 P |

FOREIGN PATENT DOCUMENTS

DE 20 2004 009 415 U1 10/2004

* cited by examiner

*Primary Examiner*—Dana Ross (57) ABSTRACT

The specification and drawings present a new method and a system for organizing and structuring a tool room manufacturing facility for reducing lead time of manufacturing component tooling. Machine tools are grouped into work cells (also called machining lines) specific to a machining process. Each work cell can comprise: a) a number (typically more than two) of machine tools required for a specific machining operation; b) a line storage system for storing pre-fixtured and palletized work pieces; and c) a track mounted robot able to transfer the pre-fixtured and palletized work pieces between the line storage system and the machine tools. The system also comprises a centralized storage system for storing pre-manufactured standard components (work pieces), custom fixtures and pre-manufactured work pallets.

21 Claims, 4 Drawing Sheets

MANUFACTURING SYSTEM ARCHITECTURE FOR TOOLS

TECHNICAL FIELD

The present invention relates generally to tool manufacturing and, more specifically, to organizing and structuring a tool room manufacturing facility for reducing lead time of manufacturing component tooling.

BACKGROUND ART

The manufacturing lead-time for injection mold tools is typically 3 to 8 weeks in the telecom industry. The process of manufacturing an injection mold tool is complex and involves many steps, the main ones being:

Component CAD (computer aided design) file import and adjustment/correction;
Mold tool design;
Creation of numerical control programs for CNC (computer numerical control) machine tools;
Rough machining of tool components;
Hardening of tool components;
Finish machining of tool components;
Machining of electrodes for electro discharge machining (EDM);
EDM of tool components;
Tool assembly.

One of the issues in the manufacture of tooling is a set up of the tool room logistics to minimize the manufacturing lead-time. In consumer product industries where time to market is critical, tooling lead-time is often an important factor for product development.

Conventional tool rooms utilize production planning systems that contain significant elements of waiting time for individual tool components. Much of this waiting time is to compensate for a lack of visibility of the component status and availability of the component to start the next process.

Another feature of conventional tool rooms is the serial manufacture of identical/similar components. This is often due to restrictions or bottlenecks within the machining capacity.

Tool manufacturing at short lead times in a consistent manner is usually mostly constrained by the topography of the manufacturing system.

Furthermore, there are several relevant areas which include (but are not limited to):

Palletized chip identification systems. Such systems exist in the precision tooling industry. One particularly well known one is that by EROWA JMS PRO or ZWICKER WINSTAT.

Tool room shop floor logistics management systems. A number of software systems exist as commercially available products, typically from such suppliers as SYSTEM 3R, EROWA and ZWICKER.

Robot served sub cells in machining systems. For example, a commercially available system from EROWA consists of a storage carousel positioned between two machine tools and a robot which moves pre-palletised components between the storage carousels and machine tools as directed by the shop floor logistics management system, wherein one robot serves maximum two machine tools (e.g., see U.S. Pat. No. 6,754,557 "System and Method for Manufacturing Plastic and Injection Stack Components" by Len Graham). A cell operator loads components onto a fixture and measures any required datum offset dimensions. This fixture is then loaded to a storage carousel that is able to read an identification chip from the fixture. When the machine tool is available, the robot takes the palletized work piece and loads it to the machine tool using a fixture chucking system. The logistics management software also loads a necessary CNC instruction program to the same machine tool. When the machining operation is complete, the robot returns the palletized work piece to the storage carousel. As well as moving the work piece, it is also common to move pre-mounted electrodes between the storage carousel and the machine tool—as typically required for EDM processes. The storage system does not have to be a carousel and, e.g., in ZIMMER and KREIM system, the storage system is a plain rack.

DISCLOSURE OF THE INVENTION

According to a first aspect of the invention, a system for manufacturing component tooling, comprises: K machining lines, wherein K is an integer of at least a value of one and each of the K machining lines comprises: N machine tools, for performing specific machining operations, wherein N is an integer of at least a value of two, a line storage system, for storing pre-fixtured and palletized work pieces, and a track mounted robot, for loading the pre-fixtured and palletized work pieces from the line storage system to the N machine tools for performing one of the specific machining operations and for unloading after completing the specific machining operation the pre-fixtured and palletized work pieces taken from the N machine tools back to the line storage system, wherein the N machine tools are arranged in such a way that the pre-fixtured and palletized work pieces can be loaded to and unloaded from each of the N machine tools with the track mounted robot; and a centralized storage system, for storing, custom fixtures, pre-manufactured work pallets and pre-manufactured standard components, wherein work pieces are chosen from pre-manufactured standard components, wherein a total number of track mounted robots in the systems is no more than one third of a total number of machine tools in the systems served by the track mounted robots.

According further to the first aspect of the invention, the N machine tools may be identical.

Further according to the first aspect of the invention, the system may be for manufacturing mold tooling.

Still further according to the first aspect of the invention, the system may be for manufacturing injection mold tooling, compression mold tooling, decoration mold tooling, liquid silicone injection tooling, metal injection mold tooling or ceramic injection mold tooling.

According further to the first aspect of the invention, the system may be for metal press tooling, die cast tooling, thixomold tooling or assembly tooling.

According still further to the first aspect of the invention, at least one of the K machining lines may be for:

a) milling roughing with gun drilling,
b) high speed milling,
c) electrode milling,
d) wire electro-discharge machining, or
e) electro-discharge machining.

According further still to the first aspect of the invention, the line storage system may comprise a rotating carousel.

According yet further still to the first aspect of the invention, the system may further comprise: at least one operator station, for setting the pre-fixtured and palletized work pieces. Further, an operator of the operator station may transfer pre-fixtured and palletized work piece from the operator station to the line storage system of one of the K machining lines and, after performing the specific machining operation, from the line storage system back to the at least one operator station, to an assembly station or to another machining line of the K machining lines.

Yet still further according to the first aspect of the invention, each of the K machining lines may further comprise: a storage for adaptor fixtures used for adapting the pre-fixtured and palletized work pieces to the N machine tools using the track mounted robot.

Still yet further according to the first aspect of the invention, the system may further comprise: an assembly station, for assembling the work pieces after performing the specific machining operations.

According to a second aspect of the invention, a method for manufacturing component tooling, comprises the steps of: setting a pre-fixtured and palletized work piece using custom fixtures, pre-manufactured work pallets and pre-manufactured standard components stored in a centralized storage system, wherein the work piece is chosen from pre-manufactured standard components; placing the pre-fixtured and palletized work piece to a line storage system of one of K machining lines, wherein K is an integer of at least a value of one, and loading, using a track mounted robot, the pre-fixtured and palletized work piece taken from the storage system to one of the N machine tools of the one of the K machining lines for performing a specific machining operation, wherein N is an integer of at least a value of two; performing the specific machining operation by the one of the N machine tools; and unloading after completing the specific machining operation, using a track mounted robot, the pre-fixtured and palletized work piece taken from one of the N machine tools back to the line storage system, wherein the N machine tools are arranged in such a way that the pre-fixtured and palletized work pieces can be loaded to and unloaded from each of the N machine tools with a track mounted robot, and wherein a total number of track mounted robots in the K machining lines is no more than one third of a total number of machine tools served by the track mounted robots in the K machining lines.

According further to the second aspect of the invention, the N machine tools may be identical.

Further according to the second aspect of the invention, the component tooling may be injection mold tooling.

Still further according to the second aspect of the invention, the at least one of the K machining lines may be for:
 a) milling roughing with gun drilling,
 b) high speed milling,
 c) electrode milling,
 d) wire electro-discharge machining, or
 e) electro-discharge machining.

According further to the second aspect of the invention, the line storage system may comprise a rotating carousel.

According still further to the second aspect of the invention, the setting the pre-fixtured and palletized work piece may be performed at least one operator station, and after the setting, the method may comprise the step of: placing the pre-fixtured and palletized work piece by an operator of the operator station to the line storage system of one of the K machining lines. Further, after performing the step of unloading, the method may comprise the step of: transferring the pre-fixtured and palletized work piece by the operator from the line storage system back to the at least one operator station, to an assembly station or to another machining line of the K machining lines.

According further still to the second aspect of the invention, each of the K machining lines may further comprise a storage for adaptor fixtures, which are used for adapting the pre-fixtured and palletized work piece to the N machine tools using the track mounted robot.

According to a third aspect of the invention, an electronic device comprising a component manufactured using a system for manufacturing of tooling with a reduced lead time, the system comprises: K machining lines, wherein K is an integer of at least a value of one and each of the K machining lines comprises: N machine tools, for performing specific machining operations, wherein N is an integer of at least a value of two, a line storage system, for storing pre-fixtured and palletized work pieces, and a track mounted robot, for loading the pre-fixtured and palletized work pieces from the line storage system to the N machine tools for performing one of the specific machining operations and for unloading after completing the specific machining operation the pre-fixtured and palletized work pieces taken from the N machine tools back to the line storage system, wherein the N machine tools are arranged in such a way that the pre-fixtured and palletized work pieces can be loaded to and unloaded from each of the N machine tools with the track mounted robot; and a centralized storage system, for storing, custom fixtures, pre-manufactured work pallets and pre-manufactured standard components, wherein work pieces are chosen from pre-manufactured standard components, wherein a total number of track mounted robots in the systems is no more than one third of a total number of machine tools in the systems served by the track mounted robots.

According to a fourth aspect of the invention, a component manufactured using a system for manufacturing of tooling with a reduced lead time, the system comprises:

K machining lines, wherein K is an integer of at least a value of one and each of the K machining lines comprises: N machine tools, for performing specific machining operations, wherein N is an integer of at least a value of two, a line storage system, for storing pre-fixtured and palletized work pieces, and a track mounted robot, for loading the pre-fixtured and palletized work pieces from the line storage system to the N machine tools for performing one of the specific machining operations and for unloading after completing the specific machining operation the pre-fixtured and palletized work pieces taken from the N machine tools back to the line storage system, wherein the N machine tools are arranged in such a way that the pre-fixtured and palletized work pieces can be loaded to and unloaded from each of the N machine tools with the track mounted robot; and a centralized storage system, for storing, custom fixtures, pre-manufactured work pallets and pre-manufactured standard components, wherein work pieces are chosen from pre-manufactured standard components, wherein a total number of track mounted robots in the systems is no more than one third of a total number of machine tools in the systems served by the track mounted robots.

MODES FOR CARRYING OUT THE INVENTION

A new method and a system are presented for organizing and structuring a tool room manufacturing facility for reducing lead time of manufacturing component tooling. The invention relates to the structure and organization of the tool room manufacturing facility to achieve minimum possible lead time for the production of the component tooling such that these components are manufactured in the most time efficient way.

According to embodiments of the present invention, a shop floor arrangement comprises:
  Machine tools grouped into work cells (also called machining lines) specific to a machining process which typically utilize a robot line;
  A centralized storage system for storing pre-manufactured standard components (work pieces), custom fixtures and pre-manufactured work pallets;
  Operator stations containing an instruction screen delivering instructions and specifications from a logistics management system, component washing/degreasing station and a 3D measuring system. Another term for a logistics management system is an MES, which stands for Manufacturing Execution System. An operator usually handles components in operation stations and transfers work pieces (e.g., pre-fixtured and palletized) to and from work cells (machining lines) and ancillary processes; and
  Ancillary processes, for supporting machining operations using operator instruction screens delivering instructions and specifications. Ancillary processes do not justify a robot line and do not fit into an automated machining line. For example, ancillary processes, such as grinding, part cleaning (removing cutting lubricant), deburring, assembly operations, inspection operations (e.g., measuring critical dimensions), etc. can happen at various points in the overall manufacturing cycle. The manufacturing cycle for a component would usually involve the component being placed into more than one machining line. The ancillary processes can be located anywhere, subject to usual material flow considerations. Typically, an assembly station is also a part of an ancillary processes.

According to an embodiment of the present invention, each work cell (or a machining line) can comprise:
  A number of machine tools required for a specific machining operation, wherein the machine tools are arranged in such a way that the work piece can be loaded and unloaded with a track mounted robot; the machine tools can be identical in their function;
  A line storage system for storing pre-fixtured and palletized work pieces, wherein the pre-fixtured and palletized work pieces can be accessed by the operator independently from the robot;
  A track mounted robot able to transfer the pre-fixtured and palletized work pieces between the line storage system and the machine tools. The pre-manufactured standard components are mounted onto custom fixtures and pre-manufactured work pallets by an operator at the operator stations before they are loaded into the machining lines. The pallets can be pre-manufactured and systems of such pallets are available from different manufacturers (e.g., from EROWA). Custom fixtures are constructed upon these pallets. According to an embodiment of the present invention, each pallet has a feature for a unique identification: usually a remotely readable chip.

According to an embodiment of the present invention, each work cell (machining line) can comprise multiple (typically more than two) identical machines of similar capability. Furthermore, the work cells can be configured for different machining operations which comprise but are not limited to:
  Rough milling of hardened steel;
  Precision high speed milling of hardened steel;
  Precision high speed milling of EDM electrodes;
  Wire EDM;
  EDM, etc.

According to embodiments of the present invention, the manufacturing of the component tooling can be applied (but not be limited) to:
  mold tooling;
  injection mold tooling;
  metal press tooling;
  compression mold tooling, e.g., for thermoset plastics and silicone rubbers
  decoration mold tooling, e.g., for cosmetically decorated injection molded components using techniques provided by NISSHA or KURTZ;
  liquid silicone injection tooling;
  metal injection mould tooling;
  ceramic injection mould tooling;
  die cast tooling;
  thixomold tooling;
  die cutting tools;
  assembly tooling, e.g., for jigs and fixtures, etc.

According to an embodiment of the present invention, the operator of the operator station transfers the pre-fixtured and palletized work pieces (after setting them up) from the operator station to the line storage system of one of the machining lines and, after the specific machining operation is performed, from the line storage system back to the operator station, to an assembly station or to another machining line for a different machining operation. Additionally each machining line can comprise a storage for adaptor fixtures, which can be used for adapting said pre-fixtured and palletized work pieces to the machine tools using the track mounted robot.

According to an embodiment of the present invention, the work cells (machining line) can typically be supplemented by other operations (the ancillary processes discussed above, e.g., profile grinding, assembly operations, etc.) that do not require the scale of machining capacity to justify an automated work cell.

According to embodiments of the present invention, one robot can serve more than two machine tools and the limit for a number of machine tools to be served by one robot being that the robot activity rate ensures that machine tools are not waiting for the robot. Moreover, according to an embodiment of the present invention, a total number of track mounted robots in the systems is typically at least three times less than a total number of machine tools in the systems (in all machining lines) served by the track mounted robots. Equivalently, the total number of track mounted robots in the systems is no more than one third of the total number of machine tools in the systems (in all machining lines) served by the track mounted robots.

For some machining operations, to complete the whole operation within the machining line, two types of machine tool are required. An example of this is the Wire Electro Discharge Machining (WEDM) process. In this process, a fine metallic wire passes through the work piece and cuts through the hardened steel component by means of an electric current passing between the wire and the tool steel, causing many small amounts of work piece material to be burnt away. Where the profile to be cut out from the work piece does not start at an external edge to the component, a starter hole is required to initially feed the wire through. In traditional tool making, this starter hole is created by drilling a hole in the work piece before hardening. An alternative process, which allows the use of pre-hardened work piece blocks, is to make the hole through by the EDM process, specifically using a thin tubular electrode. This machine is sometimes referred to as a "hole shooter". Thus, in a typical WEDM work cell, the machine tools incorporated would be WEDM machines with one or more "hole shooters" to create the starting holes. This means that, according to an embodiment of the present invention, the work cell can be capable of the complete WEDM process.

Thus, the embodiments of the present invention relate to a system topography that applies industry best practices in such a way to create a system that can manufacture tooling in a short lead-time consistently and repeatedly. Rapid tooling, specifically for mold tooling, described by embodiments of the present invention, provides the opportunity for:

Shorter product development lead times;
Quicker response to changing market volume requirements;
Operator customizations on molded covers; etc.

It is also noted that the tool manufacturing described in the embodiment of the present invention can be applied to manufacturing of components in electronic devices such as mobile phones (e.g., by rapid injection molding of covers of such electronic devices).

Figure 1:
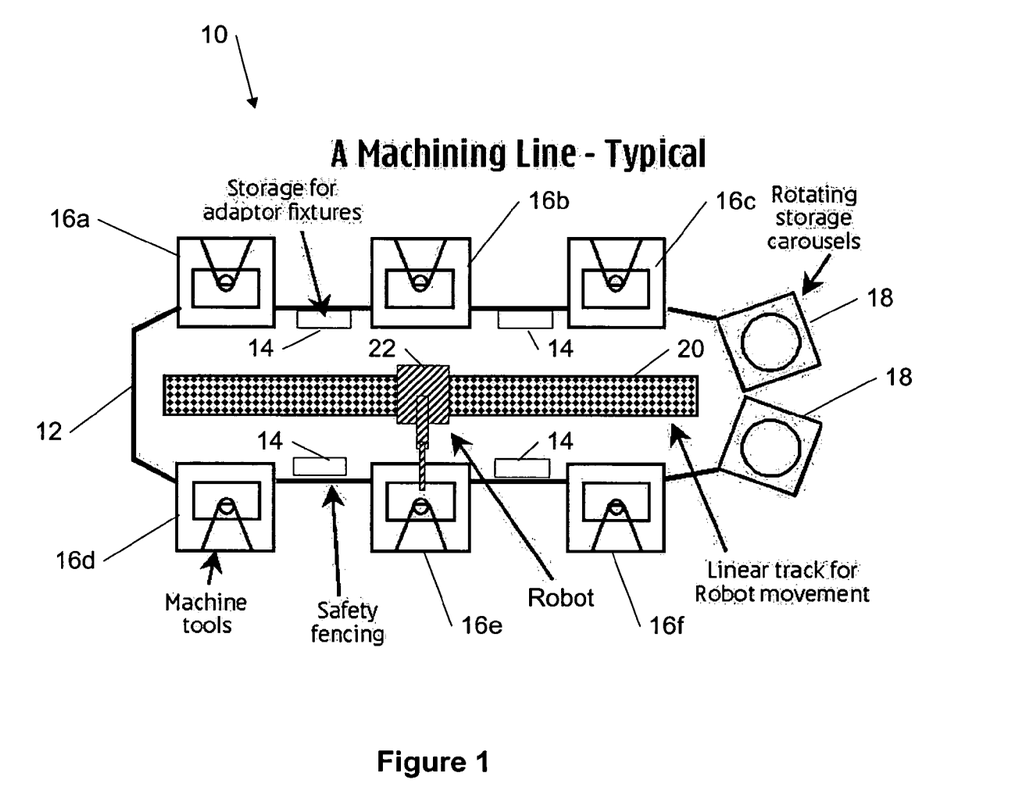
FIG. 1 is a layout of a machining line, according to an embodiment of the present invention.

FIG. 1 shows an example among others of a layout of a machining line 10, according to an embodiment of the present invention. The machining line 10 comprises: machine tools 16a, 16b, 16c, 16d, 16e, 16f for performing a specific machining operation. Typically, the machine tools 16a, 16b, 16c, 16d, 16e, 16f are identical. Generally, a number of machine tools can be N, wherein N is an integer of at least a value of two, but typically N is three or more. Moreover, the machining line 10 further comprises: a line storage system 18, implemented as rotating storage carousels for the example of FIG. 1, and used for storing pre-fixtured and palletized work pieces, and a track mounted robot 22 (mounted on a track 20), for loading the pre-fixtured and palletized work pieces to the machine tools 16a, 16b, 16c, 16d, 16e and/or 16f for performing the specific machining operation and for unloading, after completing the specific machining operation, the pre-fixtured and palletized work pieces taken from the machine tools back to the line storage system 18. The machine tools 16a, 16b, 16c, 16d, 16e, 16f (or N machine tools in general) are arranged in such a way that the pre-fixtured and palletized work pieces can be loaded to and unloaded from each of the N machine tools with said track mounted robot 22. Also FIG. 1 shows a storage 14 for adaptor fixtures such that these adaptor fixtures can be used for adapting the pre-fixtured and palletized work pieces to the machine tools 16a, 16b, 16c, 16d, 16e, 16f (or N machine tools) using the track mounted robot 22. The machining line 10 can have a safety fence 12 for protection.

Figure 2:
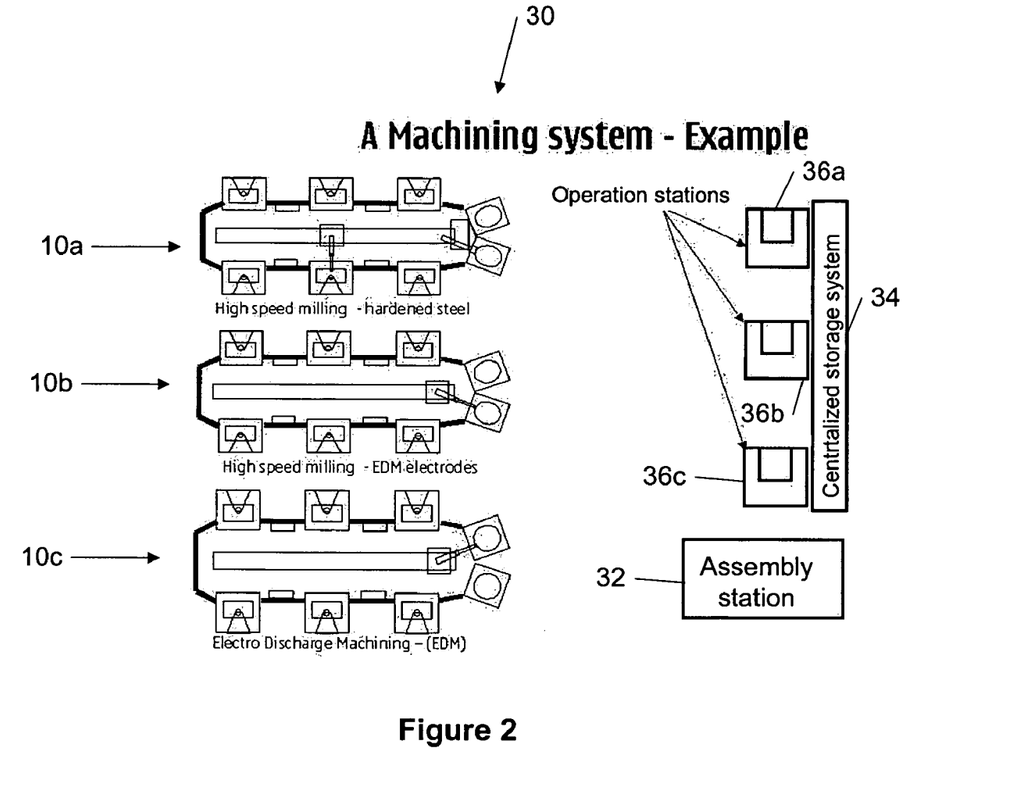
FIG. 2 is a layout of a system for manufacturing component tooling, according to an embodiment of the present invention.

FIG. 2 shows an example among others of a layout of a system 30 for manufacturing component tooling, according to an embodiment of the present invention. In this example, different machining lines 10a (for high speed milling of a hardened steel), 10b (for high speed milling of EDM electrodes) and 10c (for EDM) are combined in one system thus creating the complete tool manufacturing capability. Other lines (e.g., the wire EDM, etc.) described above can be added. Each of the machining lines 10a, 10b and 10c is organized similar to the machining line 10 of FIG. 1. In general, according to the present invention, the system can have K machining lines, wherein K is an integer of at least a value of one and each of said K machining lines comprises the elements of FIG. 1 as described above.

FIG. 2 also shows a centralized storage system 34 which is used for storing custom fixtures, work pallet assemblies (or pre-manufactured work pallets) and pre-manufactured standard components (work pieces). Operator stations 36a, 36b and 36c (the number of operator stations can vary) are used for setting said pre-fixtured and palletized work pieces by operators of these operation stations, such that the operators transfer pre-fixtured and palletized work pieces from the operator stations 36a, 36b or 36c to the line storage system 18 of one of the machining lines 10a, 10b and 10c (or K machining lines in general) and, after performing said specific machining operation, from said line storage system 18 back to one of the operator stations 36a, 36b or 36c, to an assembly station 32 or to another machining line of the machining lines 10a, 10b and 10c (or K machining lines in general). The assembly station 32 is used for assembling the work pieces after performing the specific machining operations on one of the work lines 10a, 10b or 10c (or K machining lines in general).

According to an embodiment of the present invention, a total number of track mounted robots 22 in the systems 30 is at least three times less than a total number of machine tools in the systems (in all machining lines) served by the track mounted robots 22.

Figure 3A:
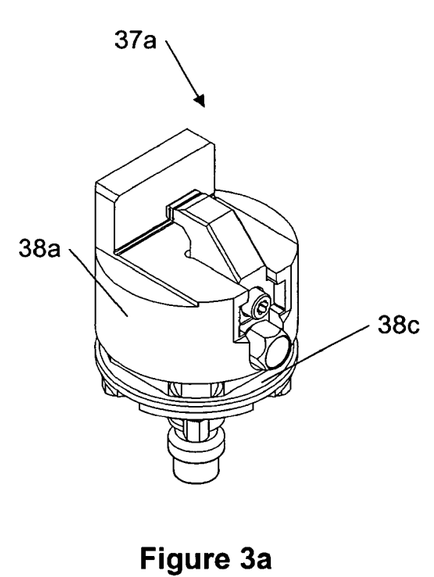
FIGS. 3a and 3b are exemplary pictures of pallets and custom fixtures without (FIG. 3a) and with (FIG. 3b) a pre-manufactured standard component (work piece)
Figure 3B:
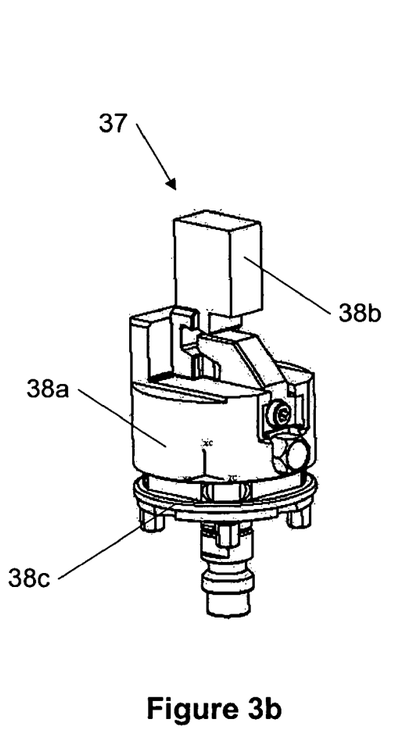

FIGS. 3a and 3b show examples among many others of pictures of assemblies 37a and 37, respectively, comprising a pre-manufactured work pallet 38c and a custom fixture 38a without (FIG. 3a) and with (FIG. 3b) a pre-manufactured standard component (work piece) 38b. In this example, the custom fixture 38a has actually been machined (or bolted) into the top of the pallet 38c. Thus the custom fixture 38a supports and clamps the pre-manufactured standard component 38b to be machined. Typically the pallet 38c is a flat module and the custom fixture 38a is a separate element bolted to its surface of the pallet 38c. As it was discussed above, the elements 38a, 38b and 38c are stored in the centralized storage system 34.

For each component that has to be manufactured, a design is created in a 3D (three-dimensional) CAD (computer aided design) system. A process map is added to this design as well as CNC (computer numerical control) programs created for the individual machining operations. The process map and the attached CNC programs are then passed over to a manufacturing execution system (MES), (e.g., a commercially available ZWICKER WINSTAT system).

The MES provides workflow instructions to the operation stations (e.g., 36a, 36b and 36c shown in FIG. 2). The operator combines pre-manufactured standard parts with custom fixtures as described above. The identity of the fixture/component assembly is registered with the MES by scanning an RFID (radio frequency identification) chip (or a similar feature) on the fixture. These fixture-pallet-mounted parts (working pieces) are than taken to the machining line (e.g., the machining line 10a, 10b or 10c) as directed by the MES and the operator loads them into the line storage system 18 (e.g., the carousel). Access to the carousel is via a door external to the safety fence 12, which has safety interlocks. When the door is shut, the carousel rotates and scans the id chips on all loaded fixtures. The use of a carousel is not mandatory: other storage solutions could be used for facilitating the line storage system 18.

The MES selects the next available machine on the machining line (e.g., the machining line 10a, 10b or 10c) and instructs the robot 22 to take the pre-fixtured and palletized work piece to that machine and load it onto the chuck system. According to an embodiment of the present invention, for providing flexibility for different pallet types that the fixture can be built upon, a number of pallet adaptors are stored in the storage 14, e.g., on racks within the machining line 10 (rectangular racks are shown between machine tools) in FIG. 1. If an adaptor fixture is required, the MES instructs the robot 22 to first fit the adaptor fixture to the machine tool.

The MES also transfers the necessary CNC program instructions to the machine tool and triggers the start of the machining process.

When the machining process is complete, the MES instructs the robot 22 to transfer the pre-fixtured and palletized work piece back to the line storage system 18 (e.g., the storage carousel). The MES then instructs the operator to collect the pre-fixtured and palletized work piece from the carousel. The operator may be instructed to transfer the work piece assembly directly to another machining line (e.g., 36a, 36b or 36c) but usually would be instructed to return the work piece to the operation station where a number of alternative actions can be done individually or in any combination thereof, as described below:

Use a washing station to remove any cutting lubricant and metal chips from the previous cutting process;

Make any visual inspections required, e.g., looking for chipped graphite electrodes;

Measure any inspection dimensions;

Do any manual work such as breaking sharp edges or removing machining burrs;

Change of the component (the work piece) from one fixture type to a different fixture type;

Make any presetting dimensions (i.e., the component location) for subsequent machining operations to eliminate any errors in component location on the pallet.

Remove the component ready for inclusion in a subsequent assembly, etc.

If a further machining operation is required then the process described above is repeated but the component fixture assembly is taken to a different machine line as appropriate.

According to an embodiment of the present invention, it is also possible, as discussed above, to utilize additional processes that are not in the automated machining lines. An example of this is profile grinding where a small number of machines (1 or 2) gives sufficient capacity for the whole system. The flow of work to and from the additional machines is still controlled by the MES.

According to an embodiment of the present invention, the assembly station 32 is where all machined components (work pieces) are provided and assembled into the final manufacturing tool. If necessary, the assembly station 32 can contain any equipment for fine fitting of the individual components.

The MES system controls the start of the assembly operations by flagging when all necessary components are available. The MES also advises when the assembly operation is complete including any predefined quality checks. This is done via an operator interface panel.

Thus, multiple machine tools (e.g., 16a, 16b, 16c, 16d, 16e and 16f, or N machine tools in general) with an identical specification within a machining line (e.g., line 10) allow the allocation of work from the line storage system 18 (e.g., the carousel in one implementation) to the next available machine tool. Manual handling of the pre-fixtured and palletized work pieces between machining lines and manual processes allows greater flexibility of process execution. A relatively large number of machines tools that each process line can contain allow for more efficient parallel working process, which directly helps to reduce overall lead time for the tool manufacturing. The ratio of robots to machine tools can be significantly reduced compared to other automated system architectures which creates cost benefits but also reduces the complexity of the control system.

Furthermore, according to embodiments of the present invention, the described method supports a hierarchical control system. At the top level, the next manufacturing operation defines which process line the work piece is taken to next. Also, the expansion of the machining system is possible by the addition of other processes. This is achieved by adding new machining lines—each built around a track-mounted robot. These lines can be implemented without disturbing the running system. Consistent use of verified machining processes creates a controlled machining process capability that allows for more accurate tool manufacture and the reduction of fitting operations during tool assembly.

Figure 4:
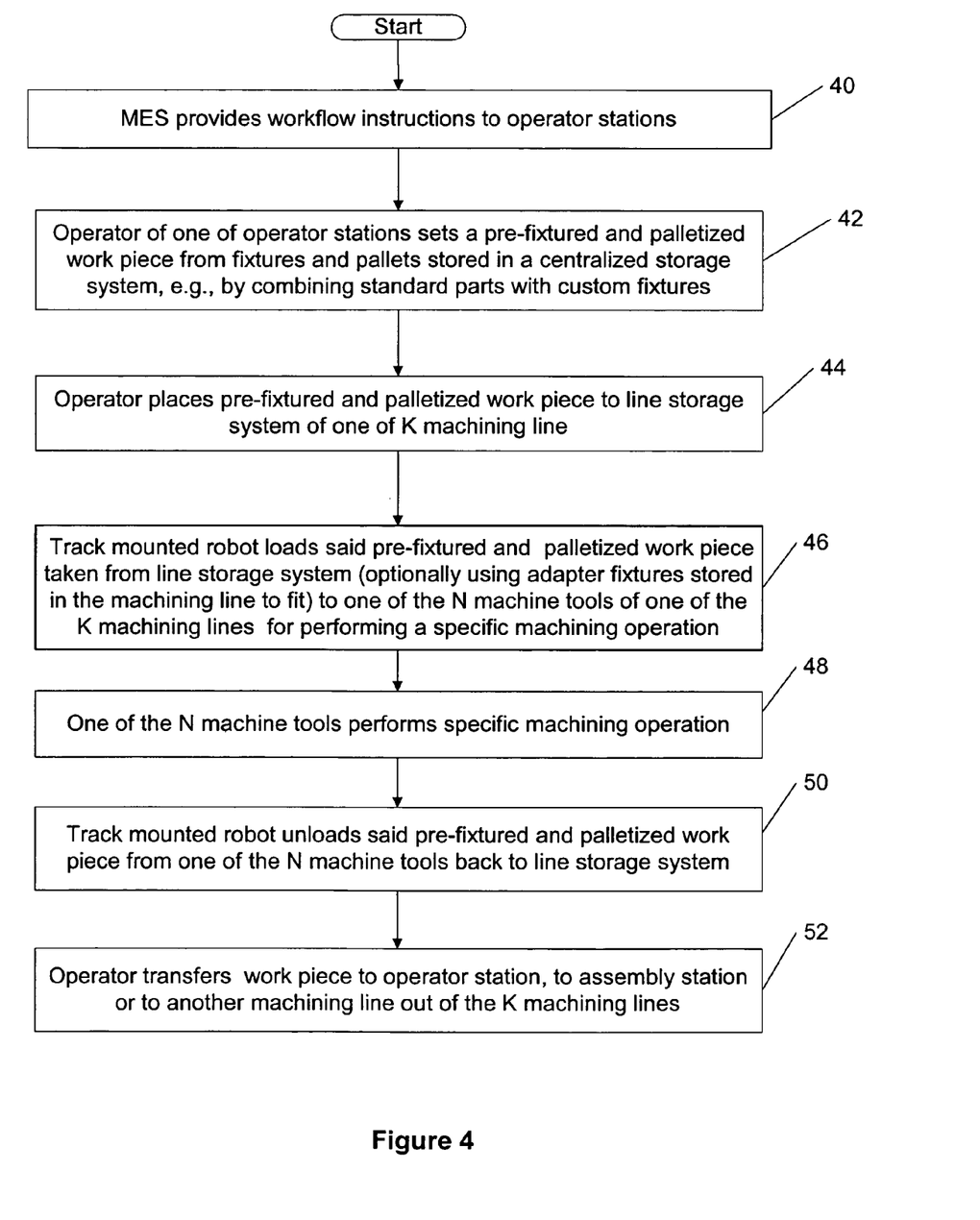
FIG. 4 is a flow chart of a process for manufacturing component tooling, according to an embodiment of the present invention.

FIG. 4 is a flow chart of a process for manufacturing component tooling, according to an embodiment of the present invention.

The flow chart of FIG. 4 only represents one possible scenario among others. In a method according to an embodiment of the present invention, in a first step 40, the MES provides workflow instructions to operator stations (36a, 36b and/or 36c), In a next step 42, the operator of one of the operator stations 36a, 36b or 36c sets a pre-fixtured and palletized work piece from fixtures and pallets stored in a centralized storage system 34, e.g., by combining standard parts (pre-manufactures standared components and work pallets) with custom fixtures. In a next step 44, the operator places the pre-fixtured and palletized work piece to the line storage system 18 (e.g., the carousel) of one of the K machine lines (e.g., 10a, 10b or 10c shown in FIG. 2).

In a next step 46, the track mounted robot 22 loads the pre-fixtured and palletized work piece taken from the line storage system 18 to one of the N machine tools of one of the K machining lines (optionally using adapter fixtures stored in the storage 14 of the K machining lines) for performing a specific machining operation. In a next step 48, the one of the N machine tools performs the specific machining operation. In a next step 50, the track mounted robot 22 unloads the pre-fixtured and palletized work piece from the one of the N machine tools back to the line storage system (carousel) 18. Finally, in a next step 52, the operator transfers the work piece to the operator station (36a, 36b or 36c), to the assembly station 32 or to another machining line out the K machining lines.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A system, comprising:
   K machining lines configured to manufacture component tooling, wherein K is an integer of at least a value of one and each of said K machining lines comprises:

N machine tools, for performing specific machining operations, wherein N is an integer of at least a value of two,
a line storage system, for storing pre-fixtured and palletized work pieces in order to reduce lead time for said manufacturing of said component tooling, and
a track mounted robot, for loading said pre-fixtured and palletized work pieces from said line storage system to the N machine tools for performing one of said specific machining operations and for unloading after completing the specific machining operation said pre-fixtured and palletized work pieces taken from the N machine tools back to said line storage system,
wherein said N machine tools are arranged in such a way that the pre-fixtured and palletized work pieces can be loaded to and unloaded from each of the N machine tools with said track mounted robot;
a centralized storage system, configured to store custom fixtures, pre-manufactured work pallets and pre-manufactured standard components, wherein work pieces are chosen from pre-manufactured standard components; and
at least one operator station, configured to set said pre-fixtured and palletized work pieces from pre-manufactured standard components combined with at least one of said custom fixtures and said pre-manufactured work pallets using workflow instructions,
wherein at least one machining line of said K machining lines comprises at least three machine tools.

2. The system of claim 1, wherein said N machine tools are identical.

3. The system of claim 1, wherein said system is for manufacturing mold tooling.

4. The system of claim 1, wherein said system is for manufacturing injection mold tooling, compression mold tooling, decoration mold tooling, liquid silicone injection tooling, metal injection mold tooling or ceramic injection mold tooling.

5. The system of claim 1, wherein said system is for manufacturing metal press tooling, die cast tooling, thixomold tooling or assembly tooling.

6. The system of claim 1, wherein at least one of said K machining lines is for:
   milling roughing with gun drilling,
   high speed milling,
   electrode milling,
   wire electro-discharge machining, or electro-discharge machining.

7. The system of claim 1, wherein said line storage system comprises a rotating carousel.

8. The system of claim 1, wherein a pre-fixtured and palletized work piece of said pre-fixtured and palletized work pieces is transferred from said at least one operator station to said line storage system of one of the K machining lines and, after performing said specific machining operation, from said line storage system back to the at least one operator station, to an assembly station or to another machining line of said K machining lines.

9. The system of claim 1, wherein each of said K machining lines further comprises:
   a storage for adaptor fixtures for adapting said pre-fixtured and palletized work pieces to said N machine tools using said track mounted robot.

10. The system of claim 1, further comprising:
    an assembly station, for assembling said work pieces after performing said specific machining operations.

11. The system of claim 1, wherein a total number of track mounted robots in the system is no more than one third of a total number of machine tools in said system served by said track mounted robots.

12. A method, comprising:
    storing custom fixtures, pre-manufactured work pallets and pre-manufactured standard components in a centralized storage system, wherein work pieces are chosen from pre-manufactured standard components;
    setting pre-fixtured and palletized work pieces from said pre-manufactured standard components combined with at least one of said custom fixtures and said pre-manufactured work pallets using workflow instructions in at least one operator station;
    placing said pre-fixtured and palletized work piece to a line storage system of one of K machining lines in order to reduce lead time for said manufacturing of said component tooling, said K machining lines being for manufacturing component tooling, wherein K is an integer of at least a value of one, and
    loading, using a track mounted robot, said pre-fixtured and palletized work piece taken from said storage system to one of the N machine tools of said one of the K machining lines for performing a specific machining operation, wherein N is an integer of at least a value of two;
    performing said specific machining operation by said one of the N machine tools; and
    unloading after completing the specific machining operation, using a track mounted robot, said pre-fixtured and palletized work piece taken from one of the N machine tools back to said line storage system,
    wherein said N machine tools are arranged in such a way that the pre-fixtured and palletized work pieces can be loaded to and unloaded from each of the N machine tools with a track mounted robot, and
    wherein at least one machining line of said K machining lines comprises at least three machine tools.

13. The method of claim 12, wherein said N machine tools are identical.

14. The method of claim 12, wherein said component tooling is injection mold tooling.

15. The method of claim 12, wherein at least one of said K machining lines is for:
    milling roughing with gun drilling,
    high speed milling,
    electrode milling,
    wire electro-discharge machining, or
    electro-discharge machining.

16. The method of claim 12, wherein said line storage system comprises a rotating carousel.

17. The method of claim 12, wherein, after performing said unloading, the method comprises:
    transferring said pre-fixtured and palletized work piece back to the at least one operator station, to an assembly station or to another machining line of said K machining lines.

18. The method of claim 12, wherein each of said K machining lines further comprises a storage for adaptor fixtures, which are used for adapting said pre-fixtured and palletized work piece to said N machine tools using said track mounted robot.

19. The method of claim 12, wherein a total number of track mounted robots is no more than one third of a total number of machine tools served by said track mounted robots.

20. A system, comprising:
K line means for manufacturing component tooling, wherein K is an integer of at least a value of one and each of said K line means comprises:
  N machine tools, for performing specific machining operations, wherein N is an integer of at least a value of two,
  a line storage system, for storing pre-fixtured and palletized work pieces in order to reduce lead time for said manufacturing of said component tooling, and
  a track mounted robot, for loading said pre-fixtured and palletized work pieces from said line storage system to the N machine tools for performing one of said specific machining operations and for unloading after completing the specific machining operation said pre-fixtured and palletized work pieces taken from the N machine tools back to said line storage system,
  wherein said N machine tools are arranged in such a way that the pre-fixtured and palletized work pieces can be loaded to and unloaded from each of the N machine tools with said track mounted robot;
  storing means, for storing, custom fixtures, pre-manufactured work pallets and pre-manufactured standard components, wherein work pieces are chosen from pre-manufactured standard components; and
  operating means for setting said pre-fixtured and palletized work pieces from pre-manufactured standard components combined with at least one of said custom fixtures and said pre-manufactured work pallets using workflow instructions,
  wherein at least one machining line of said K machining lines comprises at least three machine tools of said N machine tools.

21. The system of claim 20, wherein said K line means are K machining lines and said storing means is a centralized storage system.

* * * * *